US009533633B2

(12) United States Patent
Sato et al.

(10) Patent No.: US 9,533,633 B2
(45) Date of Patent: Jan. 3, 2017

(54) WIRE HARNESS

(71) Applicant: SUMITOMO WIRING SYSTEMS, LTD., Mie (JP)

(72) Inventors: Takeshi Sato, Mie (JP); Isamu Hamamoto, Mie (JP); Tetsuya Sonoda, Mie (JP); Ryuusuke Yamada, Mie (JP); Yoshihiro Imase, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 14/650,877

(22) PCT Filed: Aug. 8, 2013

(86) PCT No.: PCT/JP2013/071529
§ 371 (c)(1),
(2) Date: Jun. 10, 2015

(87) PCT Pub. No.: WO2014/097676
PCT Pub. Date: Jun. 26, 2014

(65) Prior Publication Data

US 2015/0321625 A1 Nov. 12, 2015

(30) Foreign Application Priority Data

Dec. 20, 2012 (JP) ................................ 2012-277664

(51) Int. Cl.
*B60R 16/02* (2006.01)
*B60R 13/08* (2006.01)
(Continued)

(52) U.S. Cl.
CPC ........... *B60R 16/0215* (2013.01); *B60R 13/08* (2013.01); *H02G 3/04* (2013.01); *H02G 3/30* (2013.01); *H02G 3/36* (2013.01)

(58) Field of Classification Search
CPC .. B60R 16/0207; B60R 16/0215; B60R 13/08; H02G 3/04; H02G 3/36; H02G 3/30
(Continued)

(56) References Cited

U.S. PATENT DOCUMENTS

2010/0186197 A1* 7/2010 Inomata .............. B60R 16/0215 24/16 R
2012/0112017 A1* 5/2012 Siragusa ............. B60R 16/0215 248/74.3

(Continued)

FOREIGN PATENT DOCUMENTS

JP 2002-118934 4/2002
JP 2006-025506 1/2006

(Continued)

OTHER PUBLICATIONS

Search report from PCT/JP2013/071529, mail date is Sep. 24, 2013.

*Primary Examiner* — Hoa C Nguyen
*Assistant Examiner* — Amol Patel
(74) *Attorney, Agent, or Firm* — Greenblum & Bernstein, P.L.C.

(57) ABSTRACT

An object is to provide a wire harness capable of protecting a wire, and also capable of facilitating the mounting of the wire and a soundproofing material to a place where soundproofing (e.g., sound absorption or sound insulation) is required. The wire harness includes a wire and a soundproofing sheet. The soundproofing sheet includes a sheet-like soundproofing material that is combined integrally with the wire along the wire. A plurality of holes are formed in the soundproofing sheet at positions along a route of the wire.

3 Claims, 7 Drawing Sheets

10 90 3 3 4 4 3 3 4 90 3 1A 1B 1 11 5 3 9

(51) Int. Cl.

| | |
|---|---|
| ***H02G 3/04*** | (2006.01) |
| ***H02G 3/30*** | (2006.01) |
| ***H02G 3/36*** | (2006.01) |

(58) Field of Classification Search
USPC .......................................................... 174/72 A
See application file for complete search history.

(56) References Cited

U.S. PATENT DOCUMENTS

| | | | | |
|---|---|---|---|---|
| 2012/0132465 A1* | 5/2012 | Mabuchi | .................. | H02G 3/32<br>174/72 A |
| 2012/0156742 A1* | 6/2012 | Powell | ..................... | C10G 3/00<br>435/155 |
| 2013/0292159 A1 | 11/2013 | Gotou et al. | | |

FOREIGN PATENT DOCUMENTS

| | | | |
|---|---|---|---|
| JP | 2006025506 A | * | 1/2006 |
| JP | 2010-027242 | | 2/2010 |
| JP | 2012-161234 | | 8/2012 |
| JP | 2012161234 A | * | 8/2012 |

* cited by examiner

WIRE HARNESS

TECHNICAL FIELD

The present invention relates to a wire harness provided with a soundproofing function.

BACKGROUND ART

Wire harnesses mounted in a vehicle, typically an automobile, are required to resist breakage caused by the wire coming into contact with the surrounding members due to vibrations, for example. For this reason, a vehicle-mounted wire harness usually includes a wire protection member that covers the intermediate region between opposite ends of the wire.

For example, the wire harness described in Patent Document 1 includes a wire protection member that covers the intermediate region of a wire. The wire protection member is made up of a hard substrate, and a covering body that is welded to the substrate and is made of a felt sheet material. In the wire protection member described in Patent Document 1, the substrate and the covering body are laid on top of another so as to sandwich a wire bundle, and are welded together. Consequently, the substrate and the covering body limit the route of the wire, and protect the wire.

In a vehicle, the backside of an interior panel that constitutes the inner wall of a passenger compartment, such as an instrument panel, is a place where soundproofing (e.g., sound absorption or sound insulation) is required. For this reason, a soundproofing material is mounted on the backside of the interior panel of the vehicle, in addition to the wire.

For example, a wire harness, which is connected to electrical equipment such as a measuring instrument, a speaker, or an air bag, is fixed to the backside of the instrument panel by using a clamp or the like. In addition, a sheet-like soundproofing material is mounted on the backside of the instrument panel by means of a stapler, spot welding, a double-sided tape, or the like. The soundproofing material is made of a non-woven fabric, for example. Note that the soundproofing material also serves as a sound-absorbing material, a sound-insulating material, and a damping material.

CITATION LIST

Patent Document

Patent Document 1: JP 2010-027242A

SUMMARY OF INVENTION

Technical Problem

Nowadays, there is an increasing demand for facilitation of the operation of mounting components in the vehicle manufacturing process. Accordingly, it is desired that the wire harness and the soundproofing material, which are mounted on the backside of an interior panel of a vehicle, also can be mounted more easily than in the past.

It is an object of the present invention to provide a wire harness capable of protecting a wire, and also capable of facilitating the mounting of the wire and a soundproofing material at a place where soundproofing (e.g., sound absorption or sound insulation) is required.

Solution to Problem

A wire harness according to a first aspect of the present invention includes a wire and two soundproofing sheets. The two soundproofing sheets include two sheet-like soundproofing materials that are combined integrally with the wire in a state in which the soundproofing materials are laid on top of another with the wire being sandwiched therebetween. A plurality of holes are formed in at least one of the two soundproofing sheets that is disposed on a side opposite to a side of the support body with respect to the wire at positions along a route of the wire.

A wire harness according to a second aspect of the present invention is one aspect of the wire harness of the first aspect. The wire harness according to the second aspect further includes a plurality of binders each including a binding belt. In this case, the plurality of holes of the soundproofing sheet include a plurality of pairs of belt through holes that are formed in pairs on opposite sides of the route of the wire at a plurality of locations along the route of the wire. Furthermore, each of the plurality of binders binds the wire and a portion between a pair of belt through holes of at least the soundproofing sheet that is disposed on a side opposite to a side of the support body with respect to the wire by the belt passing through the pair of belt through holes.

A wire harness according to a third aspect of the present invention is one aspect of the wire harness according to the second aspect. In the wire harness according to the third aspect, at least a part of the plurality of binders is a belted fastener. The belted fastener includes a binding portion including the binding belt that binds the wire and the soundproofing sheet and a fastening portion that is fastened to an edge of a mounting hole of the plate-like support body. The binding belt of the belted fastener is passed through the belt through holes formed in both of the two soundproofing sheets, and binds the wire and a portion of each of the two soundproofing sheets together.

Advantageous Effects of Invention

The wire harness according to each of the above-described aspects has a structure in which the wire and the soundproofing sheet are combined integrally. Accordingly, the mounting of the soundproofing sheet and the mounting (routing) of the wire are completed by simply mounting the soundproofing sheet at a location where soundproofing is required, such as the backside of an interior panel of a vehicle. Therefore, the operation of mounting the wire and the soundproofing sheet at a location where soundproofing is required is facilitated.

Furthermore, in the wire harness according to each of the above-described aspects, the soundproofing sheet also serves as a protection member for the wire. For example, a case is conceivable where it is desirable to prevent the wire from coming into contact with a device disposed on the backside of the interior panel. In each of the above-described aspects, the two soundproofing sheets are laid on top of another with the wire being sandwiched therebetween. In this case, both the surface of the wire that faces the interior panel and the surface opposite thereto are respectively protected by the two soundproofing sheets. Further, the soundproofing sheet on the interior panel side prevents the generation of unusual noise (collision sound) caused by contact between the wire and the interior panel.

Meanwhile, when the soundproofing sheet is fixed to the back surface of the interior panel by means of a stapler, spot welding, or the like, it is necessary to identify the positions for fixation of the soundproofing sheet while avoiding the position of the wire. However, in the case where the wire is positioned closer to the interior panel than the soundproofing sheet, the wire is hidden on the backside of the soundproofing sheet when viewed from the operator who is mounting the wire harness. In this case, it is difficult to identify the positions for fixation of the soundproofing sheet.

On the other hand, in the wire harness according to each of the above-described aspects, a plurality of holes are formed in at least one of the two soundproofing sheets that is disposed on a side opposite to a side of the support body with respect to the wire at positions along the route of the wire. The plurality of holes function as marks indicating the position of the wire located on the backside of the soundproofing sheet as viewed from the operator. Accordingly, the use of the wire harness according to each of the above-described aspects makes it possible to easily identify the positions for fixation of the soundproofing sheet. As a result, the operation of mounting the wire and the soundproofing sheet is facilitated.

Further, it is easy to form the plurality of holes at desired positions of the soundproofing sheet. Specifically, the soundproofing sheet is cut out into a shape in accordance with the required specifications by performing punching on a sheet-like base made of a soundproofing material. In the punching, the plurality of holes of the soundproofing sheet can be formed at the same time as the cutting-out (cutting) of the soundproofing sheet is performed. Forming the plurality of holes in this manner is far easier than drawing marks with ink or the like.

In the second aspect, the soundproofing sheet is combined integrally with the wire by a binder. Furthermore, a plurality of binders hold the wire along the soundproofing sheet so as to follow a predetermined route. Also, a plurality of pairs of belt through holes through which the belts of the plurality of binders are passed also serve as holes as marks indicating the position of the wire.

Accordingly, the use of the wire harness according to the second aspect provides effects as follows. First, the wire and the soundproofing sheet can be easily combined integrally by using the binder. Furthermore, the holes as the marks indicating the position of the wire also serve as the belt through holes, and therefore, the step of performing processing for mounting the wire on the soundproofing sheet is simplified.

In the third aspect, at least a part of the plurality of the binders is a belted fastener. In this case, the load of the wire is supported mainly by the belted fastener by the belted fastener being fastened to the interior panel. Further, the soundproofing sheet itself is very light. Accordingly, the operation of fixing the soundproofing sheet to the interior panel by means of a stapler, spot welding, or the like can be simplified.

In the fourth aspect, the two soundproofing sheets are laid on top of another with the wire being sandwiched therebetween. In this case, both the surface of the wire that faces the interior panel and the surface opposite thereto are respectively protected by the two soundproofing sheets. Further, the soundproofing sheet on the interior panel side prevents the generation of unusual noise (collision sound) caused by contact between the wire and the interior panel.

DESCRIPTION OF EMBODIMENTS

Hereinafter, embodiments of the present invention will be described with reference to the accompanying drawings. The following embodiments are merely exemplary embodiments of the present invention, and are not intended to limit the technical scope of the present invention. For example, the wire harnesses of each of the embodiments described below are disposed on the backside of an interior panel that constitutes the inner wall of a passenger compartment of a vehicle, such as an instrument panel.

First Embodiment

Figure 1:
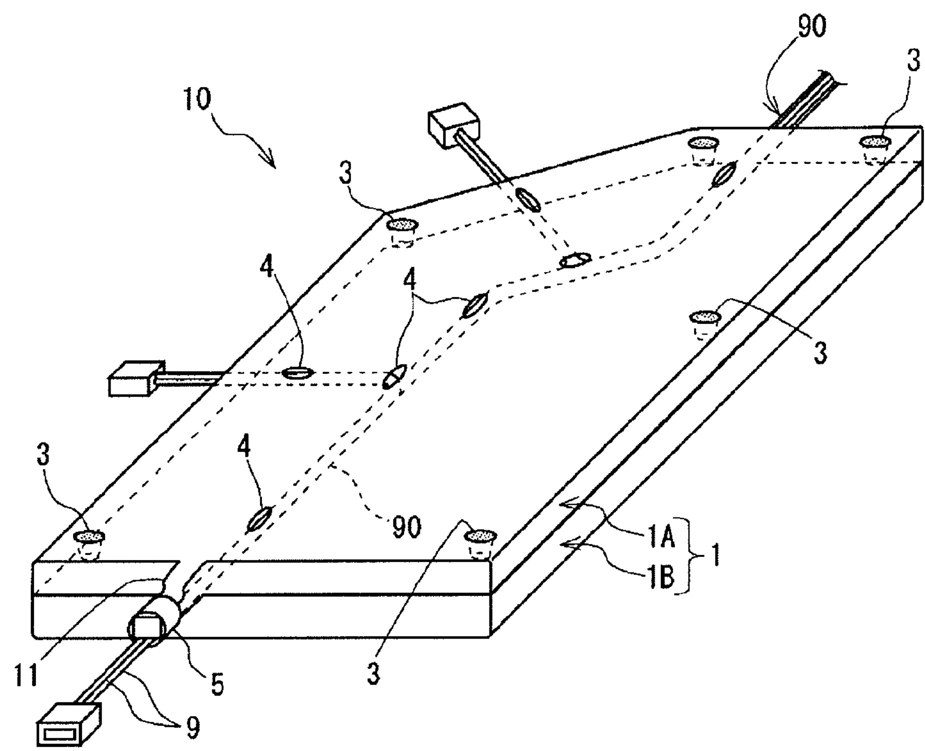
FIG. 1 is a perspective view of a wire harness 10 according to a first embodiment of the present invention.

First, a description will be given of a wire harness 10 according to the first embodiment of the present invention with reference to FIGS. 1 and 2. As shown in FIG. 1, the wire harness 10 includes a wire bundle 90 including a plurality of wires 9, and two soundproofing sheets 1A and 1B.

<Wire>

The wire bundle 90 that is to be protected by the two soundproofing sheets 1A and 1B is a bundle of a plurality of wires 9. Each wire 9 is an insulated wire including a core wire, which is a long conductor, and an insulating covering, which is an insulating body that surrounds the core wire. The core wire of the wire 9 is a metal wire rod composed mainly of copper or aluminum, for example. Additionally, the insulating covering of the wire 9 is an insulating body made of a synthetic resin such as polyvinyl chloride, polyethylene, a fluorocarbon resin, or polyester, for example. In the example shown in FIG. 1, a connector is provided at an end of the wire 9.

<Soundproofing Sheet>

Each of the two soundproofing sheets 1A and 1B is a sheet-like member made of a soundproofing material. The two soundproofing sheets 1A and 1B are disposed along an intermediate region between opposite ends of the wires 9. Further, the two soundproofing sheets 1A and 1B are combined integrally with the wires 9 along the intermediate region of the wires 9.

In the present embodiment, the two soundproofing sheets 1A and 1B are laid on top of another with the intermediate region of the wires 9 sandwiched therebetween. Note that the soundproofing material also serves as a sound-absorbing material, a sound-insulating material, and a damping material.

In the following description, the two soundproofing sheets 1A and 1B laid on top of another are referred to as a soundproofing sheet pair 1. Additionally, of the two soundproofing sheets 1A and 1B, the soundproofing sheet that is disposed on the side opposite to the interior panel side of the vehicle with respect to the wires 9 is referred to as a first soundproofing sheet 1A, and the soundproofing sheet that is disposed on the interior panel side of the vehicle with respect to the wires 9 is referred to as a second soundproofing sheet 1B.

The soundproofing sheet pair 1 is formed so as to extend two dimensionally. The soundproofing sheet pair 1 is formed to have a shape and a thickness in accordance with the required specifications. For example, the shape of the soundproofing sheet pair 1 is defined in accordance with the shape of the space in which the soundproofing sheet pair 1 is disposed. In the example shown in FIGS. 1 and 2, the soundproofing sheet pair 1 is formed in a pentagonal shape. The thickness of the soundproofing sheet pair 1 is defined in accordance with the level of the required soundproofing performance and the thickness of the space in which the soundproofing sheet pair 1 is disposed.

Each of the two soundproofing sheets 1A and 1B is made of a sheet-like soundproofing material having flexibility and elasticity. The soundproofing sheets 1A and 1B are made of a non-woven fabric, for example. Note that the soundproofing material is interchangeable with a damping material or a soundproofing material. For example, the soundproofing sheets 1A and 1B are a non-woven fabric with a thickness of about 20 mm to about 40 mm.

Here, a description will be given of a non-woven fabric. The non-woven fabric used as the soundproofing sheets 1A and 1B contains, for example, intertwined base fibers and an adhesive resin called a binder. The adhesive resin is a thermoplastic resin having a melting point (e.g., a melting point of about 110[° C.] to about 150[° C.]) lower than the melting point of the base fibers. When such a non-woven fabric is heated to a temperature that is lower than the melting point of the base fibers and higher than the melting point of the adhesive resin, the adhesive resin is melted and flows into the gaps between the base fibers. When the temperature of the non-woven fabric is subsequently lowered to a temperature lower than the melting point of the adhesive resin, the adhesive resin is cured while bonding the base fibers located therearound. Consequently, the shape of the non-woven fabric becomes more rigid than in the state before heating, and is maintained in a shape that has been molded using a mold during the heating.

The adhesive resin is a granular resin or a fibrous resin, for example. Alternatively, it is also conceivable that the adhesive resin is formed so as to surround a core fiber. Such a fiber having a structure in which a core fiber is covered with an adhesive resin is referred to as a binder fiber or the like. The same material as that of the base fiber, for example, is used as the material of the core fiber.

Aside from a resin fiber, any of various other fibers may be used as the base fiber as long as the fibrous state is maintained at the melting point of the adhesive resin. As the adhesive resin, it is possible to use, for example, a thermoplastic resin fiber having a melting point lower than the melting point of the base fiber. As a combination of the base fiber and the adhesive resin that constitute the non-woven fabric, it is conceivable to use, for example, a resin fiber composed mainly of PET (polyethylene terephthalate) as the base fiber, and to use a copolymer resin of PET and PEI (polyethylene isophthalate) as the adhesive resin. In such a non-woven fabric, the melting point of the base fiber is generally 250[° C.], and the melting point of the adhesive resin is a temperature of about 110[° C.] to about 150[° C.].

When the non-woven fabric containing the adhesive resin is heated in close contact with another member containing a thermoplastic resin, its heated portion is welded to the other member.

Further, the non-woven fabric can be molded by hot press molding. The hot press molding refers to a process of compressing a non-woven fabric that is to be processed with the non-woven fabric sandwiched between heating elements such as dies, while heating the non-woven fabric, thereby molding the non-woven fabric into the shape of the inner surfaces of the heating elements.

The non-woven fabric is heated in a mold to a temperature within the range from about 110[° C.] to about 250[° C.] during hot press molding, and is subsequently cooled. Consequently, the adhesive resin is melted to bond the surrounding base fibers. Accordingly, the non-woven fabric is molded into a shape following the inner surface of the mold, and its surface in contact with the heating elements is hardened.

A member formed as a result of the non-woven fabric being hardened by hot press molding has a certain degree of flexibility. However, the hardened non-woven fabric member has an enhanced hardness for holding a constant shape, as compared with the non-woven fabric before being subjected to hot press molding.

The two soundproofing sheets 1A and 1B are joined, with the wires 9 being sandwiched therebetween. In the example shown in FIGS. 1 and 2, welded portions 3, which are portions joined by welding, are formed on the soundproofing sheet pair 1. In the present embodiment, each welded portion 3 is a spot welded portion that is locally formed in a relatively small region.

Note that the spot shape of the welded portions 3 is not limited to a circular shape. For example, it is conceivable that the spot shape of the welded portions 3 is a polygonal shape such as a quadrilateral shape, an elliptic shape, or another different shape.

The welded portions 3 are each formed by pressing a heating element used for performing spot heating against a portion of the soundproofing sheet pair 1. As the heating element for spot heating, it is conceivable to use, for example, a metal bar with a built-in heater, or a welding horn of an ultrasonic welder such as an ultrasonic stapler.

Also, it is conceivable that an adhesion layer (not shown) is formed at at least one of the two soundproofing sheets 1A and 1B on the surface that faces the wires 9. In this case, the adhesion layer bonds the two soundproofing sheets 1A and 1B in a range extending over their entire surfaces facing each other. Thereby, the adhesion layer prevents the positional displacement of the wires 9 between the two soundproofing sheets 1A and 1B.

When the two soundproofing sheets 1A and 1B are bonded by the adhesion layer, the welded portions 3 serve the function of joining the two soundproofing sheets 1A and 1B more firmly and with high durability.

In addition, a bulged portion 11 that is bulged outwardly is formed at an outer edge of at least one of the two soundproofing sheets 1A and 1B. The bulged portion 11 is formed at an outer edge of at least one of the two soundproofing sheets 1A and 1B at a portion through which the wires 9 pass. The bulged portion 11 is bound together with the wires 9 by a binding material 5 such as an adhesive tape.

In the example shown in FIG. 1, the bulged portion 11 is formed at the outer edge of the first soundproofing sheet 1A. However, it is also conceivable that the bulged portion 11 is formed at the outer edge of the second soundproofing sheet 1B, or the bulged portion 11 is formed at both the outer edge of the first soundproofing sheet 1A and the outer edge of the second soundproofing sheet 1B.

As a result of the bulged portion 11 of the soundproofing sheets 1A and 1B and the wires 9 being bound, the length of a portion of the wires 9 that extends to the outside from the soundproofing sheet pair 1 is maintained constant. Furthermore, the position of the outer edge of the soundproofing sheet pair 1 through which the wires 9 pass is prevented from being displaced.

Note that the illustration of a plurality of bulged portions 11 is partly omitted in FIG. 1.

Figure 2:
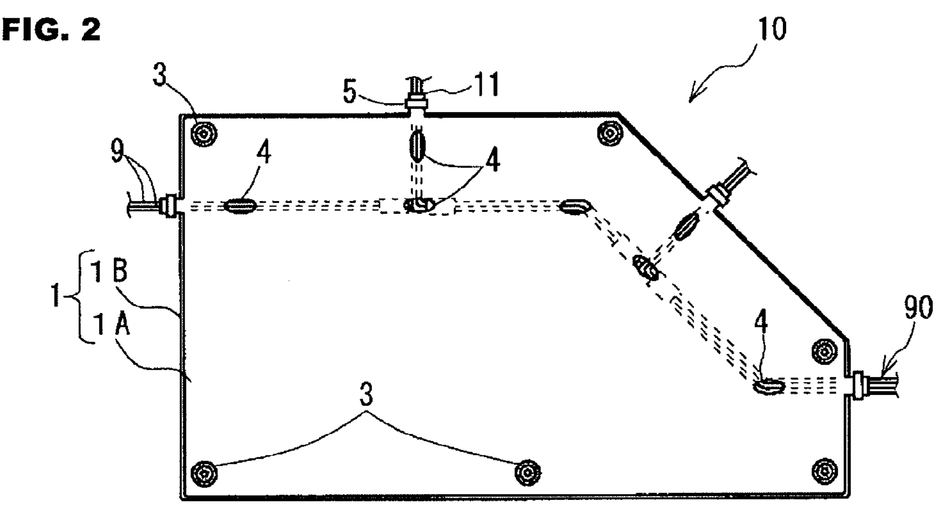
FIG. 2 is a plan view of the wire harness 10.

As shown in FIGS. 1 and 2, a plurality of holes 4 are formed in the first soundproofing sheet 1A. The plurality of holes 4 are formed at positions of the first soundproofing sheet 1A along the route of the wires 9. In the example shown in FIGS. 1 and 2, the plurality of holes 4 are formed at positions at which the wires 9 are visible through the holes 4. However, the positions of the plurality of holes 4 are not limited to those shown in FIGS. 1 and 2. It is only required that the plurality of holes 4 are formed at positions at which the route of the wires 9 can be identified when viewed from the surface of the first soundproofing sheet 1A that is opposite to the surface thereof facing the wires 9.

<Effects>

The wire harness 10 has a structure in which the wires 9 and the soundproofing sheets 1A and 1B are combined integrally. Accordingly, the mounting of the soundproofing sheets 1A and 1B and the mounting (routing) of the wires 9 are completed by simply mounting the soundproofing sheets 1A and 1B at a location where soundproofing is required, such as the backside of an interior panel of a vehicle. Therefore, the operation of mounting the wires 9 and the soundproofing sheets 1A and 1B at a location where soundproofing is required is facilitated.

Furthermore, in the wire harness 10, the soundproofing sheets 1A and 1B also serve as a protection member for the wires 9. For example, a case is conceivable where it is desirable to prevent the wires 9 from coming into contact with a device disposed on the backside of the interior panel. In this case, the wire harness 10 may be mounted on the back surface of the interior panel with the wires 9 being positioned closer to the interior panel than the first soundproofing sheet 1A.

In the wire harness 10, the two soundproofing sheets 1A and 1B are laid on top of another with the wires 9 being sandwiched therebetween. In this case, both the surface of the wires 9 that faces the interior panel and the surface opposite thereto are respectively protected by the two soundproofing sheets 1A and 1B. Further, the second soundproofing sheet 1B on the interior panel side prevents the generation of unusual noise (collision sound) caused by contact between the wires 9 and the interior panel.

Meanwhile, when the soundproofing sheets 1A and 1B are fixed to the back surface of the interior panel by means of a stapler, spot welding, or the like, it is necessary to identify the positions for fixation of the soundproofing sheets 1A and 1B while avoiding the position of the wires 9. However, the wires 9 are hidden on the backside of the first soundproofing sheet 1A when viewed from the operator who is mounting the wire harness 10. In this case, it is difficult to identify the positions for fixation of the soundproofing sheets 1A and 1B.

On the other hand, in the wire harness 10, a plurality of holes 4 are formed at positions of the first soundproofing sheet 1A along the route of the wires 9. The plurality of holes 4 function as marks indicating the position of the wires 9 located on the backside of the first soundproofing sheet 1A as viewed from the operator. Accordingly, the use of the wire harness 10 makes it possible to easily identify the positions for fixation of the soundproofing sheets 1A and 1B. As a result, the operation of mounting the wires 9 and the soundproofing sheets 1A and 1B is facilitated.

Further, it is easy to form the plurality of holes 4 at desired positions of the first soundproofing sheet 1A. Specifically, the soundproofing sheets 1A and 1B are cut out into a shape in accordance with the required specifications by performing punching on a sheet-like base made of a soundproofing material. In the punching, the plurality of holes 4 of the first soundproofing sheet 1A can be formed at the same time as the cutting-out (cutting) of the first soundproofing sheet 1A is performed. Forming the plurality of holes 4 in this manner is far easier than drawing marks with ink or the like.

Second Embodiment

Figure 3:
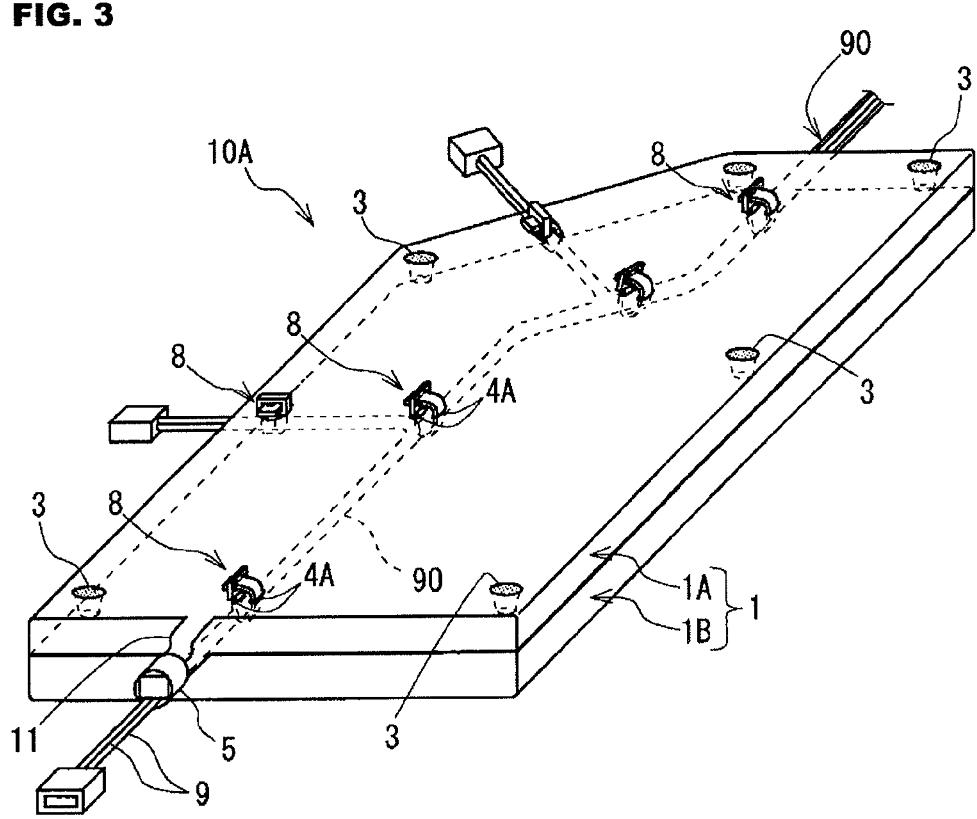
FIG. 3 is a perspective view of a wire harness 10A according to a second embodiment of the present invention.
Figure 4:
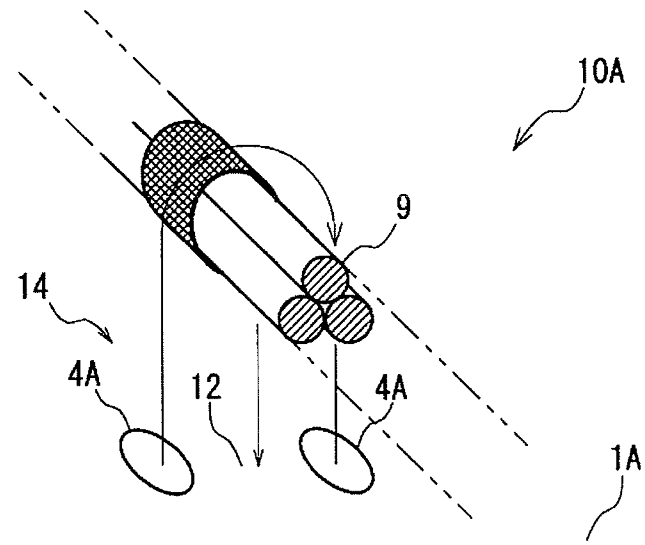
FIG. 4 is an exploded perspective view of a wire fixation portion of the wire harness 10A.
Figure 4:
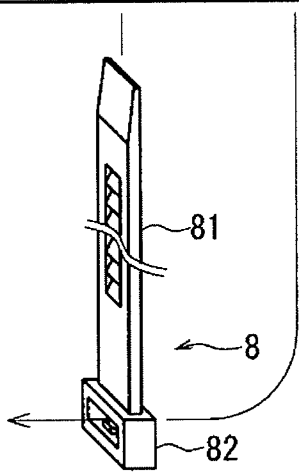
Figure 5:
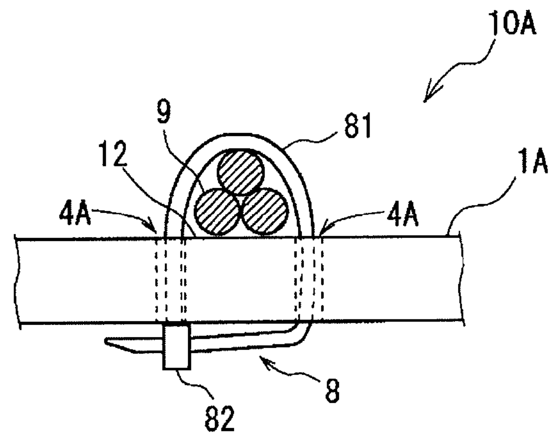
FIG. 5 is a front view of the wire fixation portion of the wire harness 10A.

Next is a description of a wire harness 10A according to a second embodiment of the present invention with reference to FIGS. 3 to 5. FIG. 3 is a perspective view of the wire harness 10A. FIG. 4 is an exploded perspective view of a wire fixation portion of the wire harness 10A. FIG. 5 is a front view of the wire fixation portion of the wire harness 10A.

The wire harness 10A is different from the wire harness 10 shown in FIGS. 1 and 2 with regard to the structure for fixing the intermediate region of the wires 9 to the soundproofing sheets 1A and 1B. In FIGS. 3 to 5, the components that are the same as those shown in FIGS. 1 and 2 are denoted by the same reference numerals. In the following, a description will be given only of the points in which the wire harness 10A differs from the wire harness 10.

As with the wire harness 10, the wire harness 10A includes a wire bundle 90 including a plurality of wires 9, and two soundproofing sheets 1A and 1B along the intermediate region of the wire bundle 90. The two soundproofing sheets 1A and 1B are combined integrally with the wires 9 along the intermediate region of the wires 9. The wire harness 10A further includes a plurality of binders 8.

As shown in FIG. 4, each of the plurality of binders 8 includes a binding belt 81 and a belt holding portion 82 that holds the belt 81 in an annular configuration. One end of the belt 81 is a fixed end that has been fixed to the belt holding portion 82 in advance, and the other end of the belt 81 is a free end.

A through hole into which the free end of the belt 81 is inserted is formed in the belt holding portion 82. Also, the belt holding portion 82 includes a catching mechanism for holding a portion of the belt 81 at a given position in the longitudinal direction within the through hole. The belt 81 is held in an annular configuration by the belt holding portion 82 holding a portion of the belt 81.

A plurality of pairs of belt through holes 4A through which the belt 81 of the binder 8 is passed are formed in the first soundproofing sheet 1A of the wire harness 10A. The plurality of belt through holes 4A are formed in a plurality of locations of the first soundproofing sheet 1A along the route of the wires 9. Further, the plurality of belt through holes 4A are formed in pairs on opposite sides of the route of the wires 9 at a plurality of locations along the route of the wires 9.

As shown in FIGS. 4 and 5, each of the plurality of binders 8 binds the wires 9 and a portion 12 between a pair of the belt through holes 4A of the first soundproofing sheet 1A by the belt 81 passing through the pair of belt through holes 4A. The belt holding portion 82 holds the belt 81 in an annular configuration so as to bind the wires 9 and the portion 12 between the pair of the belt through holes 4A.

In other words, the wires 9 are bound to the portion 12 between the pair of the belt through holes 4A of the first soundproofing sheet 1A by the binder 8. Consequently, the wires 9 are combined integrally with the first soundproofing sheet 1A. Further, the wires 9 are fixed at a predetermined position of the first soundproofing sheet 1A by the binder 8.

The plurality of pairs of belt through holes 4A are holes through which the belts 81 of the binders 8 are passed. Furthermore, the plurality of pairs of belt through holes 4A are also holes that function as marks indicating the position of the wires 9 located on the backside of the first soundproofing sheet 1A.

That is, in the wire harness 10A, the plurality of pairs of belt through holes 4A of the first soundproofing sheet 1A correspond to the plurality of holes 4 of the first soundproofing sheet 1A of the wire harness 10. In the example shown in FIG. 3, the plurality of holes that function as the marks indicating the position of the wires 9 are all belt through holes 4A. However, it is also conceivable that the plurality of holes that function as the marks indicating the position of the wires 9 include the holes 4 of the wire harness 10 and the belt through holes 4A of the wire harness 10A.

The use of the wire harness 10A can provide the same effects as those achieved by the use of the wire harness 10. Furthermore, the use of the wire harness 10A provides effects as follows.

First, the wires 9 and the first soundproofing sheet 1A can be easily combined integrally by using the binder 8. Furthermore, the holes as the marks indicating the position of the wires 9 also serve as the belt through holes 4A, and therefore, the step of performing processing for mounting the wires 9 on the soundproofing sheets 1A and 1B is simplified.

Third Embodiment

Figure 6:
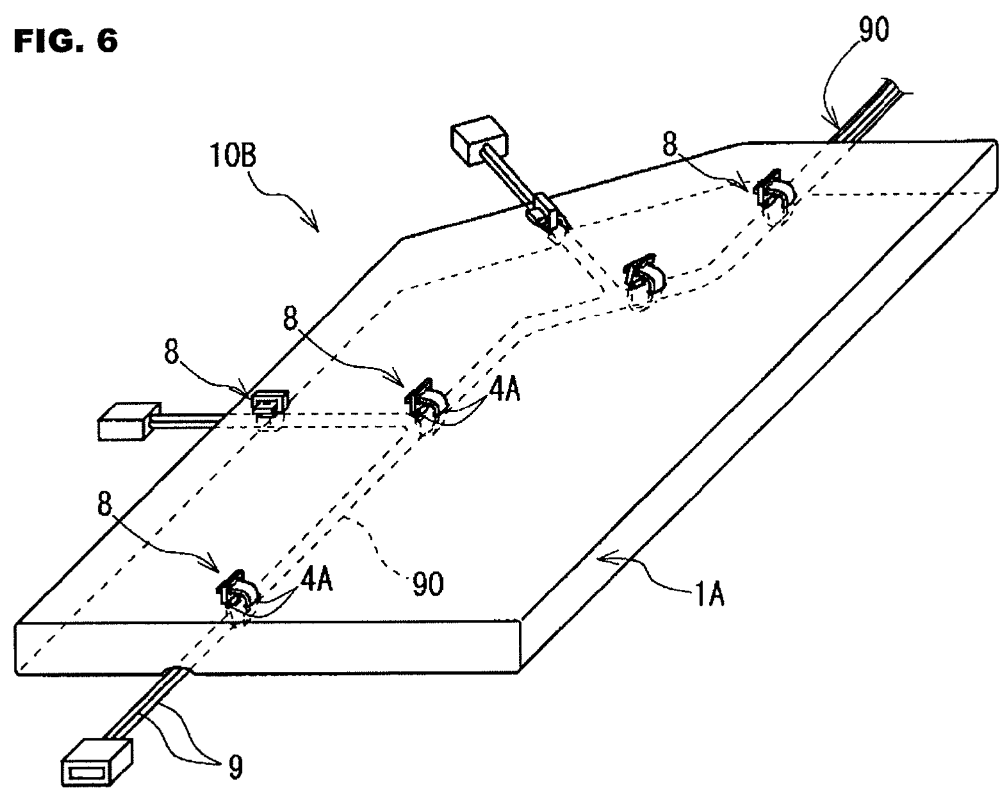
FIG. 6 is a perspective view of a wire harness 10B according to a third embodiment of the present invention.

Next is a description of a wire harness 10B according to a third embodiment of the present invention with reference to FIG. 6. FIG. 6 is a perspective view of the wire harness 10B.

The wire harness 10B has a configuration in which the second soundproofing sheet 1B is omitted from the wire harness 10A shown in FIGS. 3 to 5. In FIG. 6, the components that are the same as those shown in FIGS. 1 to 5 are denoted by the same reference numerals. In the following, a description will be given only of the points in which the wire harness 10B differs from the wire harness 10A.

The wire harness 10B includes a wire bundle 90 including a plurality of wires 9, a first soundproofing sheet 1A along an intermediate region of the wire bundle 90, and a plurality of binders 8. The first soundproofing sheet 1A is combined integrally with the wires 9 along the intermediate region of the wires 9 by the plurality of binders 8. Further, the wires 9 are fixed at a predetermined position of the first soundproofing sheet 1A by the binders 8.

Accordingly, a plurality of pairs of belt through holes 4A through which the belts 81 of the binders 8 are passed are formed in the first soundproofing sheet 1A of the wire harness 10B. The plurality of belt through holes 4A are formed at a plurality of locations of the first soundproofing sheet 1A along the route of the wires 9. Further, the plurality of belt through holes 4A are formed in pairs on opposite sides of the route of the wires 9 at a plurality of locations along the route of the wires 9.

That is, the wire harness 10B has a configuration in which the second soundproofing sheet 1B is removed from the configuration of the wire harness 10A.

The use of the wire harness 10B can provide the same effects as those achieved by the use of the wire harnesses 10 and 10A. Note, however, that the wire harness 10B does not have a structure for preventing the contact between the wires 9 and the interior panel.

Fourth Embodiment

Figure 7:
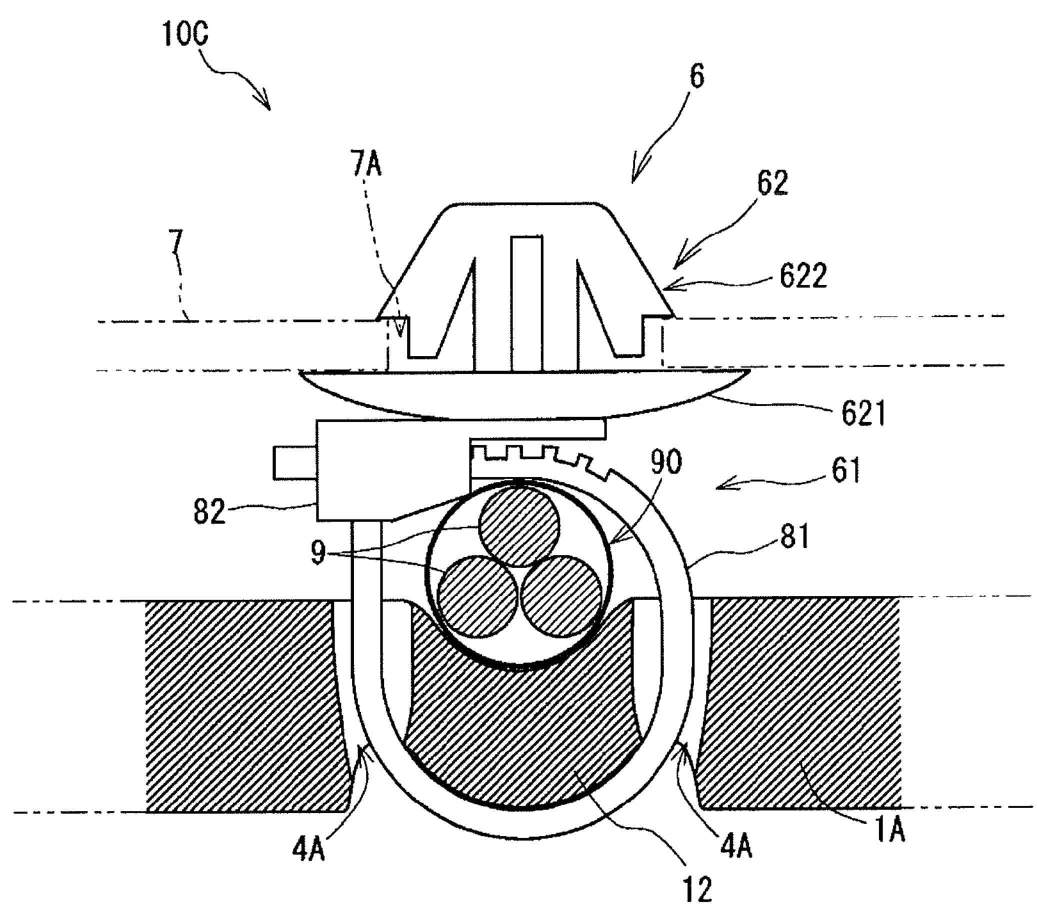
FIG. 7 is a cross-sectional view of a wire fixation portion of a wire harness 10C according to a fourth embodiment of the present invention.
Figure 8:
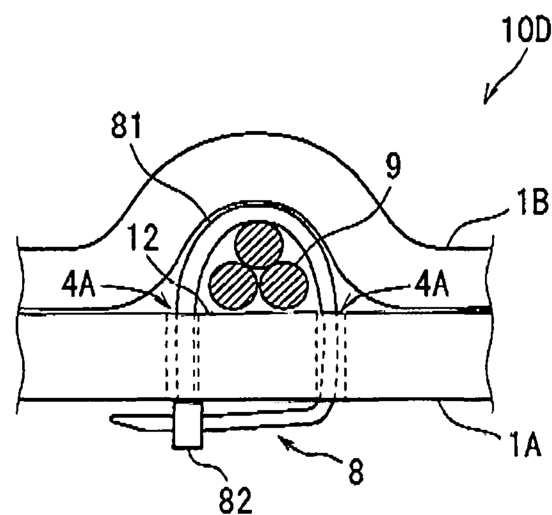
FIG. 8 is a cross-sectional view of a wire harness 10D according to a modified embodiment in which the a plurality of pairs of through holes are formed in a soundproofing sheet.
Figure 9:
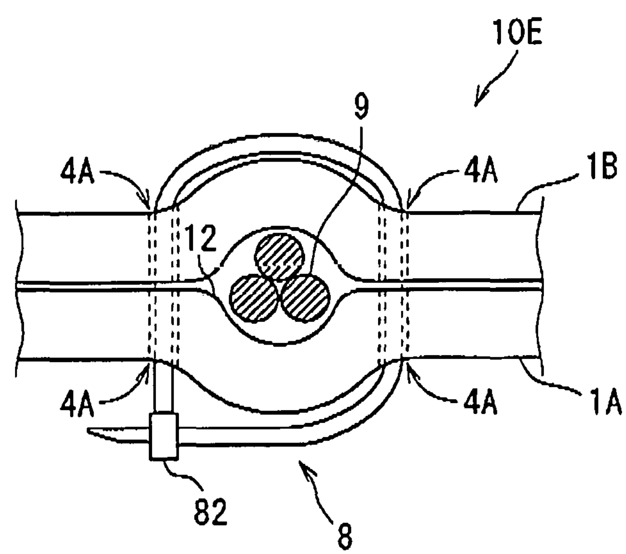
FIG. 9 is a cross-sectional view of a wire harness 10E according to another modified embodiment in which the a plurality of pairs of through holes are formed in two soundproofing sheets.
Figure 10:
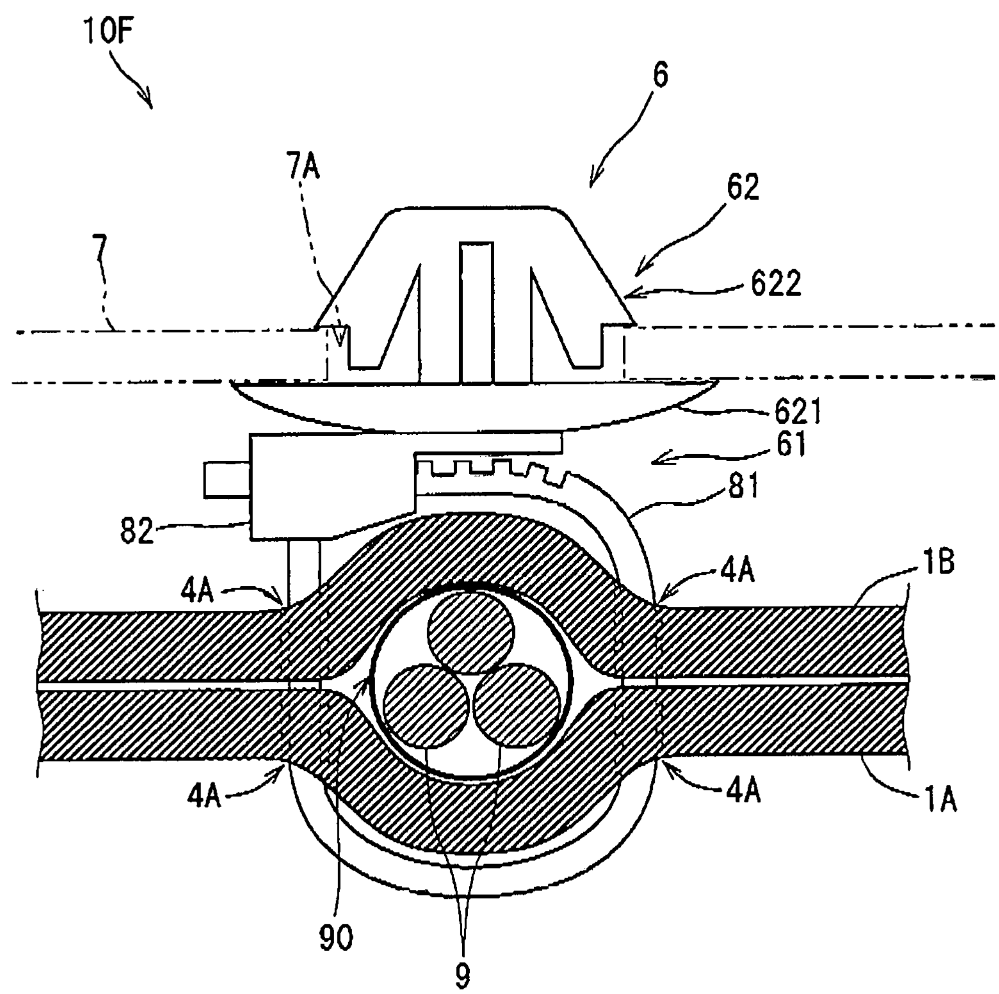
FIG. 10 is a cross-sectional view of the plurality of holes formed in the two soundproofing sheets of a wire harness 10F, which is disposed on a side opposite to a side of a support body with respect to the wire.

Next is a description of a wire harness 10C according to a fourth embodiment of the present invention with reference to FIG. 7. FIG. 7 is a cross-sectional view of a wire fixation portion of the wire harness 10C.

The wire harness 10C has a configuration in which at least a part of the plurality of binders 8 is replaced by a belted fastener 6 in the configuration of the wire harness 10B shown in FIG. 6. FIG. 7 is a cross-sectional view of a wire fixation portion formed by using a belted fastener 6 of the first soundproofing sheet 1A.

The belted fastener 6 is a well-known tool used for fastening the wires 9 to a plate-like support body 7. The belted fastener 6 includes a binding portion 61 and a fastening portion 62. For example, the support body 7 is an interior panel such as an instrument panel. Note that the support body 7 is depicted by the phantom line (dashed double-dotted line) in FIG. 7. A mounting hole 7A is a through hole formed in the plate-like support body 7.

For example, the belted fastener 6 is a member made of a thermoplastic resin such as polypropylene (PP) or polyamide (PA). In the present embodiment, the belted fastener 6 is a member that has been molded in one piece in its entirety.

The binding portion 61 includes a binding belt 81 and a belt holding portion 82 that holds the belt 81 in an annular configuration. In the present embodiment, the belt 81 of the binding portion 61 is passed through a pair of belt through holes 4A of the first soundproofing sheet 1A. The binding portion 61 binds the wires 9 and a portion 12 between the pair of belt through holes 4A of the first soundproofing sheet 1A by the belt 81 passing through the pair of belt through holes 4A.

That is, the binding portion 61 corresponds to the binder 8 included in the wire harness 10A and 10B. The belted fastener 6 including the binding portion 61 is an example of the binder 8.

The fastening portion 62 is a portion that is fastened to an edge of the mounting hole 7A of the plate-like support body 7. The fastening portion 62 includes a flange portion 621 that is continuous with the binding portion 61 and an insertion portion 622 that is formed so as to stand up from the flange portion 621.

The flange portion 621 is a portion that covers the mounting hole 7A. Accordingly, the flange portion 621 is formed in a dish shape having a larger area than the area of the mounting hole 7A.

The insertion portion 622 is a portion that is inserted into the mounting hole 7A formed in the support body 7. When inserted into the mounting hole 7A of the support body 7, the insertion portion 622 is partly caught on an edge of the mounting hole 7A of the support body 7 from the side opposite to the flange portion 621. Then, the flange portion 621 and the insertion portion 622 clamp the edge of the mounting hole 7A of the support body 7. Consequently, the fastening portion 62 is fastened to the edge of the mounting hole 7A of the support body 7.

In the wire harness 10C, at least a part of the plurality of binders 8 is a belted fastener 6. In this case, the load of the wires 9 is supported mainly by the belted fastener 6 by the belted fastener 6 being fastened to the support body 7 such as an interior panel. Further, the first soundproofing sheet 1A itself is very light.

Accordingly, the operation of fixing the first soundproofing sheet 1A to the interior panel by means of a stapler, spot welding, or the like can be simplified. For example, it is possible to reduce the number of locations for fixation of the first soundproofing sheet 1A by means of a stapler, spot welding, or the like.

<Others>

In the wire harness 10A shown in FIGS. 3 to 5, it is also conceivable that the binder 8 binds a portion of the first soundproofing sheet 1A, the wires 9, and a portion of the second soundproofing sheet 1B together. In this case, the plurality of pairs of belt through holes 4A are formed in both the first soundproofing sheet 1A and the second soundproofing sheet 1B.

Furthermore, it is also conceivable that when the binder 8 binds a portion of the first soundproofing sheet 1A, the wires 9, and a portion of the second soundproofing sheet 1B together, at least a part of the plurality of binders 8 is a belted fastener 6.

In the wire harnesses 10, 10A, 10B, and 10C, it is also conceivable that soundproofing sheets 1A and 1B are a sheet-like soundproofing material other than a non-woven fabric. For example, it is also conceivable that the soundproofing sheets 1A and 1B are a sheet-like member made of a foamed resin. Also, 10D, 10E and 10F illustrate other aspects of the present disclosure.

Note that the wire harness according to the present invention can be configured by freely combining the above-described embodiments, or by modifying or partly omitting the embodiments as needed, within the scope of the invention as set forth in the claims.

REFERENCE SIGNS LIST

1 Soundproofing sheet pair (two soundproofing sheets)
1A, 1B Soundproofing sheet
3 Welded portion
4 Hole of soundproofing sheet
4A Belt through hole
5 Binding material
6 Belted fastener
7 Support body
7A Mounting hole of support body
8 Binder
9 Wire
11 Bulged portion
12 Portion between a pair of belt through holes
61 Binding portion
62 Fastening portion
81 Belt
82 Belt holding portion
90 Wire bundle
621 Flange portion
622 Insertion portion

The invention claimed is:

1. A wire harness, comprising:

a wire; and two soundproofing sheets including two sheet-like soundproofing materials that are combined integrally with the wire in a condition in which the soundproofing materials are laid on top of each other with the wire sandwiched therebetween and in which a plurality of holes are formed at positions along a route of the wire, wherein the plurality of holes are formed in at least one of the two soundproofing sheets that is disposed on a side opposite to a side of a support body with respect to the wire, and wherein the plurality of holes in the soundproofing sheet include a plurality of pairs of through holes that are formed in pairs on opposite sides of the route of the wire at a plurality of locations along the route of the wire.

2. The wire harness according to claim 1, further comprising a plurality of binders each including a binding belt, wherein the plurality of pairs of holes are belt through holes, and each of the plurality of binders binds the wire and a portion between a pair of the belt through holes of at least the soundproofing sheet that is disposed on the side opposite to the side of the support body with respect to the wire by the belt passing through the pair of the belt through holes.

3. The wire harness according to claim 2, wherein at least a part of the plurality of binders is a belted fastener that includes a binding portion including the binding belt that binds the wire and the soundproofing sheet and a fastening portion that is fastened to an edge of a mounting hole of the support body, wherein the binding belt of the belted fastener is passed through the belt through holes formed in both of the two soundproofing sheets, and binds the wire and a portion of each of the two soundproofing sheets together.

* * * * *